Figures 1, 5:
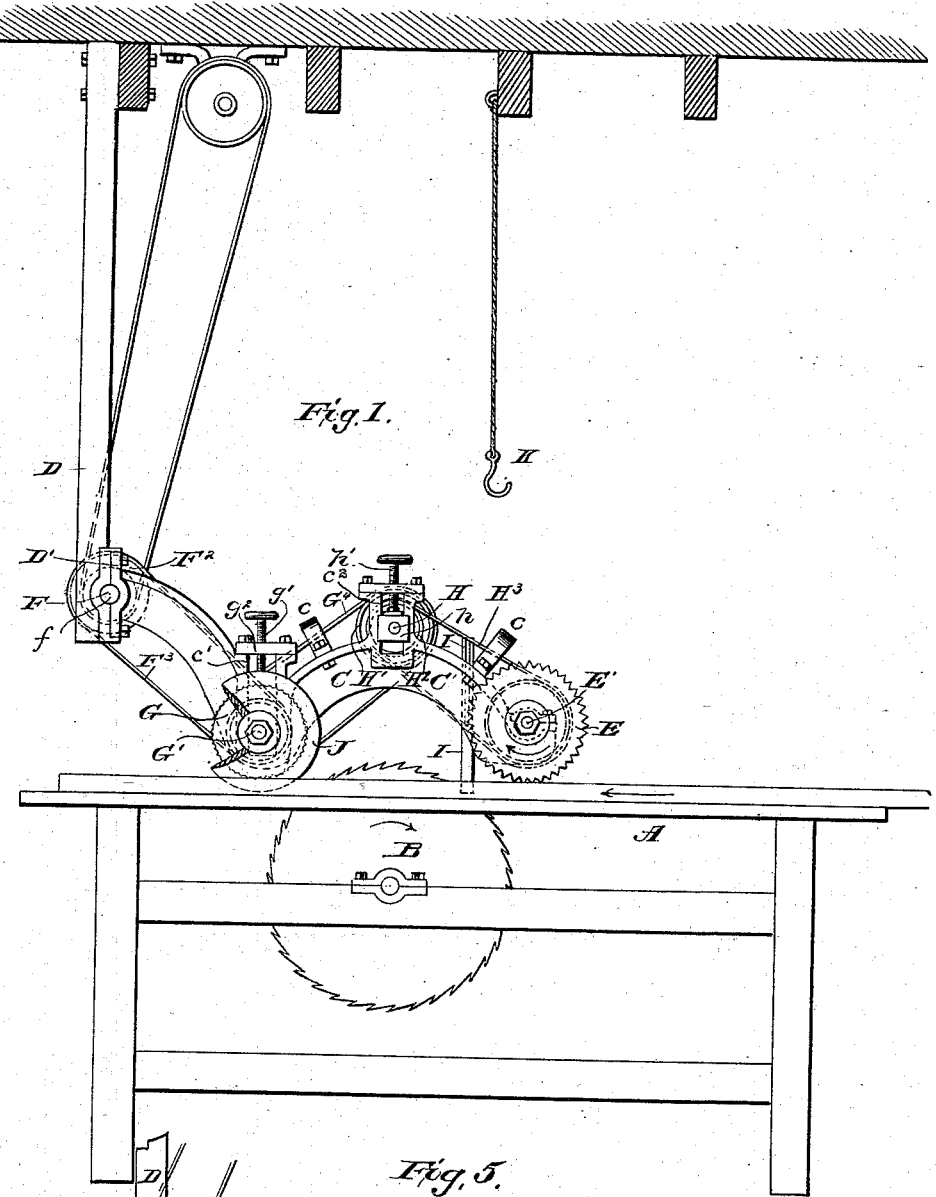

(No Model.) 2 Sheets—Sheet 1.

M. S. HARSHA.
SAW FEEDING DEVICE.

No. 288,330. Patented Nov. 13, 1883.

Witnesses.
Jno. W. Stockett,
C. C. Poole.

Inventor.
Mortimer S. Harsha
M. E. Dayton
Attorney (No Model.) 2 Sheets—Sheet 2.
M. S. HARSHA.
SAW FEEDING DEVICE.
No. 288,330. Patented Nov. 13, 1883.
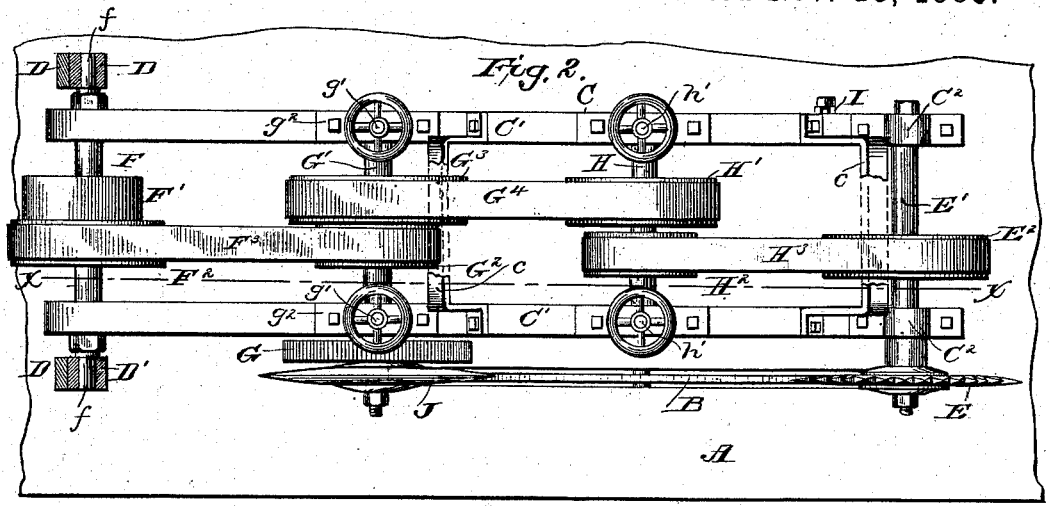
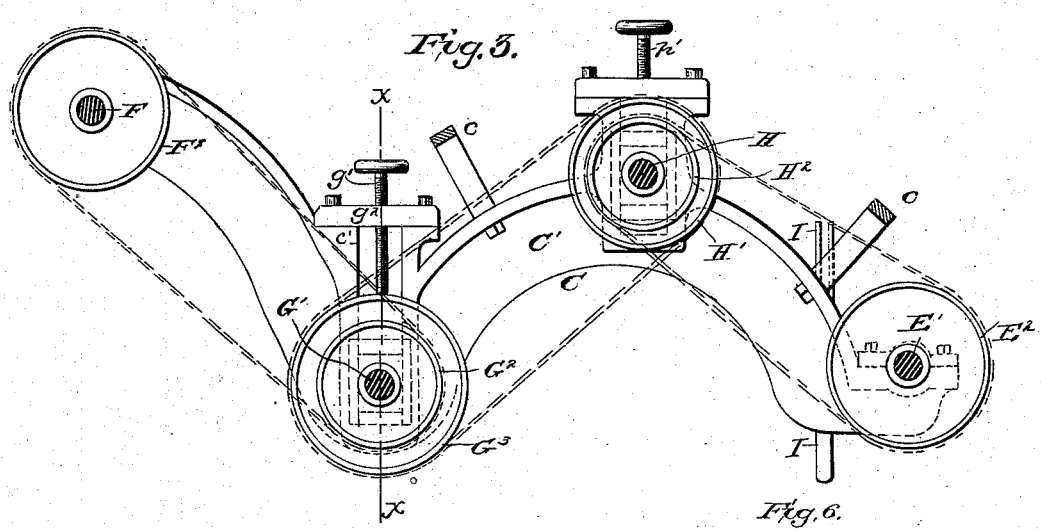
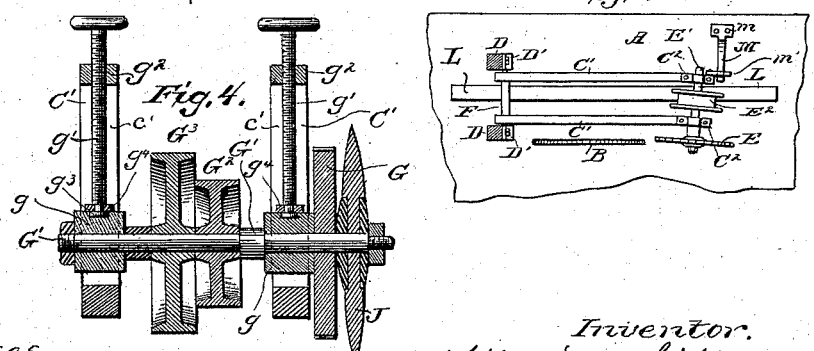
Witnesses
Jno. W. Stockett
C. C. Poole
Inventor
Mortimer S. Harsha
M. E. Dayton
Attorney

UNITED STATES PATENT OFFICE.

MORTIMER S. HARSHA, OF CHICAGO, ILLINOIS, ASSIGNOR OF ONE-HALF TO OLE BERG, OF SAME PLACE.

SAW-FEEDING DEVICE.

SPECIFICATION forming part of Letters Patent No. 288,330, dated November 13, 1883.

Application filed August 8, 1883. (No model.)

*To all whom it may concern:*

Be it known that I, MORTIMER S. HARSHA, of Chicago, in the county of Cook and State of Illinois, have invented certain new and useful Improvements in Saw-Feeding Devices; and I do hereby declare that the following is a full, clear, and exact description thereof, reference being had to the accompanying drawings, and to the letters of reference marked thereon, which form a part of this specification.

This invention relates to feeding devices for circular saws. Its object is to provide a feeding device which is independent of the saw-frame, and which can be used in connection with any saw without special adaptation thereto.

To this end the invention consists in the matters hereinafter described, and pointed out in the claims.

In the accompanying drawings, Figure 1 is a side view of a feeding device embodying my invention, shown in connection with a circular saw and the table thereof. Fig. 2 is a plan view of the same. Fig. 3 is a vertical longitudinal section taken upon line $x$ $x$ of Fig. 2. Fig. 4 is a vertical transverse section taken upon line $x$ $x$ of Fig. 3. Fig. 5 is a side view of a modified form of the device. Fig. 6 is a diagram, hereinafter referred to.

A is a saw-table, and B a circular saw, of ordinary construction.

In its general features the feeding device consists of a frame, C, which is located above the saw-table, and pivotally attached at one end to a hanger, D, supported from the ceiling of the room in which the saw is located, and upon the free end of which frame is mounted a shaft, E', carrying a feed-disk, E, said shaft being rotated by means of suitable connections with a driving-pulley, F', mounted concentrically with the pivotal point of the frame C, as shown.

As a preferable construction, and as shown in the drawings, the frame C is composed of two parallel plates, C', which are rigidly connected by braces $c$, and are pivoted to the hanger D by means of a shaft, F, rigidly secured to the ends of said plates, and having projecting ends $f$, which are journaled in boxes D' upon the said hanger, so that the free end of the frame C may be swung freely in a vertical plane.

The shaft E' of the feed-disk E is mounted in boxes $C^2$ upon the ends of the plates C', remote from the shaft F, and is provided with a driving-pulley, $E^2$, which is driven from the pulley F' by intermediate connections, as hereinafter described.

The feed-disk E is preferably secured upon the end of the shaft E', outside of the frame-plates C', and is composed of a thin steel plate provided with sharp triangular teeth upon its periphery, and is arranged in the same vertical plane with the saw, so that the marks made by the teeth thereof upon the wood will be in line with the saw-kerf and will be taken out by the saw.

The frame C is preferably placed over the saw, the hanger D being at the rear thereof, and in the frame C, between the saw and the pivotal point of said frame, is mounted a shaft, G', having bearings in boxes $g$, upon which shaft is secured a feed-roller, G, the purpose of which is to carry the material being sawed past the saw after it has advanced beyond the feed-disk E in its passage beneath said disk.

The feed-roller G is arranged at one side of the plane of the saw, and its periphery is transversely corrugated, and is constructed to rest upon and grip the surface of the material being sawed.

In order to permit the feed-roller G to be moved vertically when the feed-disk E is moved in adjusting it to operate upon material of different thicknesses, the bearing-boxes $g$ of said shaft may be constructed to slide in vertical slots $c'$ in the plates C', and moved therein by means of vertical screw-shafts $g'$, which pass through threaded apertures in caps $g^2$, placed over the tops of the slots $c'$, and are connected at their lower end to said boxes. The connections between the boxes $g$ and the shaft $g'$, as shown, are formed by enlarged portions or disks $g^3$ upon the lower ends of the said shafts, which are embraced by collars $g^4$, secured to the upper surface of the boxes $g$ in a well-known manner.

Another form of construction in which provision is made for an automatic adjustment of the feed-roller G to the surface of the stuff is shown in Fig. 5, and will hereinafter be described.

A beveled or wedged disk, J, for spreading the severed portions of the material being sawed, so as to prevent the saw from binding, may be mounted upon the end of the shaft G' at the side of the feed-roller G and in line with the saw, as shown. The said disk J, as shown, is mounted loosely upon the shaft, so that it will be rotated by the material in contact therewith, as such material is fed forward, independently of the motion of the shaft. The disk mentioned may, however, be secured to the shaft, and would, in such case, serve to aid the feed device in carrying the material forward.

The frame-plates C', in their portion between the bearings of shafts E and G, are curved or arched upwardly, so as to leave an open space around the saw, and in said frame-plates, about midway between said shafts and parallel with them, is mounted a shaft, H, provided with two pulleys, H' and $H^2$, and having bearings at its ends in vertically-movable boxes $h$, held in slots $c^2$ in the plates C', and adjustably supported in said slots by means of screw-shafts $h'$, constructed and operating in a manner similar to those described in connection with the shaft G.

The shaft G is provided upon its portion between the plates C' with two pulleys, $G^2$ and $G^3$, and said shaft is rotated by means of a belt, $F^3$, placed over a pulley, $F^2$, connected to the driving-pulley F' upon the shaft F and over the pulley $G^2$. Motion is transmitted from the shaft $G^2$ to the shaft H, by means of a belt, $G^4$, passing over the pulleys $G^3$ and H', respectively, and from the shaft H to the shaft E' by means of a belt, $H^3$, which passes around the pulleys $H^2$ and $E^2$, as shown. The object of making the shaft H vertically adjustable, as described, is to provide means for tightening the belts $G^4$ and $H^3$.

The lower end of the hanger D preferably terminates, as shown, considerably above the surface of the table B and the level of the shafts G and E' when said shafts are in working position, and the frame-plates C' are curved upwardly from the bearings of the shaft G to the point of their connection with the hanger D, the object of such construction being to enable the feeding device to be lifted up clear of the saw-table and out of the way when not in use. When the frame C is lifted it may be upheld by means of a hook, K, supported from the ceiling or other convenient place, and adapted to engage with the cross-bar $c$ or other convenient part of the frame.

A vertically-adjustable stop, I, is preferably secured to the frame C, near its free end, upon the side thereof which is remote from the saw, the lower end of such stop being arranged to rest upon the surface of the saw-table at such time as the feed-disk is not resting upon the stuff being sawed. The object of said stop is to limit the downward movement of the feed-disk E, and to prevent said disk from coming into contact with the table when the material being fed to the saw passes forward from beneath said disk. The said stop is usually adjusted, according to the thickness of the stuff being sawed, to support the feed-disk slightly below its operative position, so that the disk will readily ride up over the ends of the stuff as they are presented to it.

The feed-disk E is held in contact with the plank or board being fed to the saw by the weight of the frame C and the several parts supported thereby, and in case such weight is not sufficient to cause the teeth thereon to engage the wood being operated upon, the said frame may be weighted so as to cause said teeth to enter the surface of said wood.

A construction of the feed device is shown in Fig. 5, in which the same is automatically adjustable to stuff of different thicknesses, and in which the adjusting devices for the bearing-boxes of the shaft G are dispensed with. In this case the frame C is made in two portions, $C^2$ and $C^3$, which are pivoted together at a point concentric with the shaft G, so that both said shaft G and the shaft E, have independent vertical movements, the shaft G moving in an arc around the point of connection with the hanger H, and the shaft E upon the shaft G as a center. By this construction both the shafts G and E adjust themselves automatically to their working position, and the belts $F^3$ and $G^4$ will be unaffected by the movement of the shaft G.

The joints connecting the parts $C^2$ and $C^3$ in the modified form of the device last described are constructed with stops $c^3$, which abut when the outer end of the frame is lifted a short distance, and prevent further movement of the part $C^3$ with reference to the part $C^2$, after which the whole frame rises about the pivot F. By this construction both of the parts are lifted by raising the outer end of the frame, and may be supported by a hook, K, or otherwise, as before described.

The pivotal connection between the parts $C^2$ and $C^3$ is preferably formed by means of cylindrical projections or sleeves $c^5$ upon the side plates of the part $C^3$, which fit into corresponding apertures, $c^4$, in the side plates, $C^2$, and which form the bearings of the shaft G', as shown in Fig. 5.

The shaft E' of the feed-disk E may be slightly inclined with reference to the saw-arbor, so as to cause the stuff to bear against the guide L upon the saw-table as it is fed past the saw, as shown in Fig. 6. When this construction is used, the pulley $E^2$ upon the shaft E' may be provided with flanges, as shown, so as to retain the driving-belt on the pulley in opposition to any tendency to leave it by reason of the inclination of the pulley-shaft.

The tendency to lateral movement away from the guide L in the free end of the frame C, which would be caused by the action of the feed-disk when inclined as last described, may be counteracted by making the frame and its supports sufficiently rigid for the purpose, or by affixing a stop upon the frame C in position to engage the saw-table or the guide L thereon. Such a stop is indicated in Fig. 6, wherein M is an arm secured to the table at $m$ and extending toward the frame C at such a distance above the table as will permit the guide L to be adjusted beneath it. The free end of said arm is upturned and engages a projection, $m'$, on the frame C.

I claim as my invention—

1. The combination, with the table and saw, of a frame, C, pivoted at one end to a support independent of the saw-table, a rotary feed-disk, E, mounted upon the free end of said frame, and means independent of the saw-arbor for actuating said feed-disk, substantially as described.

2. In a saw-feeding device, the combination of a swinging frame, C, pivoted at one end to a support independent of the saw-table, a rotary feed-disk, E, and a feed-roller, G, mounted upon said frame, and means for adjusting the vertical position of the feed-disk E with reference to the roller G, substantially as and for the purpose set forth.

3. In a saw-feeding device, the combination, with a swinging frame, C, pivoted at one end to a support independent of the saw-table, of a feed-disk, E, a shaft, E', carrying said disk and mounted upon the free end of said frame, a pulley, $E^2$, on said shaft, a driving-pulley, F', mounted concentrically with the pivotal point of the swinging frame, and suitable driving connections between the said pulleys $E^2$ and F', substantially as described.

4. The combination, with the support D, provided with bearing-boxes D', of a swinging frame, C, a shaft, F, secured in one end of said frame and having bearings in said boxes D', a driving-pulley, F', mounted loosely upon said shaft F, a rotating feed-disk, E, mounted at the free end of said frame C, and intermediate connections for operating the feed-disk from the pulley F', substantially as described.

5. The combination, with the support D and frame C pivoted thereto, of a shaft, E', carrying the feed-disk E and provided with a pulley, $E^2$, a shaft, G', mounted upon said frame and provided with a pulley, $G^3$, an intermediate shaft, H, provided with pulleys H' and $H^2$, driving-belts passing over the said several pulleys for transmitting motion from the shaft G' to the shaft E', means for moving the shaft H laterally with reference to a line passing through the centers of the said pulleys and means for rotating the shaft G', substantially as and for the purpose set forth.

6. The combination, with the swinging frame, pivoted to a support independent of the saw-table, of a shaft, E', mounted in said frame, mechanism for driving said shaft and a disk, J, loosely mounted on the frame, substantially as described.

7. The combination, with a saw-table and a support, D, of a feed-frame, C, constructed of two parts pivoted to each other, a shaft, G', located in the pivotal axis of said parts and provided with a driving-pulley and a shaft, E', carrying a pulley and feed-disk, located at the end of one of the frame parts, a pivoted connection joining the opposite end of the other part of the frame with the support D, a driving-belt connecting the shafts G' and E', and means for rotating the shaft G', substantially as described.

8. In a saw-feed device, the combination, with the feed-frame C, pivoted at one end to a support independent of the saw-table, of a stationary arm, M, secured to the saw-table and constructed to engage the free end of said frame C, substantially as and for the purpose set forth.

In testimony that I claim the foregoing as my invention, I affix my signature in presence of two witnesses.

MORTIMER S. HARSHA.

Witnesses:
  M. E. DAYTON,
  WILLIAM M. STANLEY.